United States Patent [19]

Hoch

[11] Patent Number: 4,916,244

[45] Date of Patent: Apr. 10, 1990

[54] PREPARATION OF 1-AMINO-4-HYDROXY-2-(6'-HYDROXYHEXOXY)-ANTHRAQUINONE

[75] Inventor: Helmut Hoch, Weisenheim, Fed. Rep. of Germany

[73] Assignee: BASF Aktiengesellschaft, Ludwigshafen, Fed. Rep. of Germany

[21] Appl. No.: 230,451

[22] Filed: Aug. 10, 1988

[30] Foreign Application Priority Data

Aug. 13, 1987 [DE] Fed. Rep. of Germany ....... 3726983

[51] Int. Cl.$^4$ .............................................. C07C 97/26
[52] U.S. Cl. ..................................... 552/246; 552/241
[58] Field of Search ........................ 260/380; 552/246

[56] References Cited

U.S. PATENT DOCUMENTS

| | | | |
|---|---|---|---|
| 3,530,150 | 9/1970 | Rickenbacher | 260/380 |
| 3,968,131 | 7/1976 | Maier | 260/380 |
| 4,485,043 | 11/1984 | Kniel | 260/380 |

FOREIGN PATENT DOCUMENTS

| | | | |
|---|---|---|---|
| 1359458 | 3/1964 | France | 260/380 |
| 982267 | 2/1965 | United Kingdom | 260/380 |
| 1432457 | 4/1976 | United Kingdom | 260/380 |

*Primary Examiner*—Richard L. Raymon
*Assistant Examiner*—Raymond Covington
*Attorney, Agent, or Firm*—Oblon, Spivak, McClelland, Maier & Neustadt

[57] ABSTRACT

1-Amino-2-(6'-hydroxyhexoxy)-4-hydroxyanthraquinone (I) is prepared from the corresponding 2-phenoxy- or 2-halo-anthraquinone compound and 1,6-hexanediol with or without a phenol in the presence of an alkaline agent at elevated temperatures by reacting, per mole of the anthraquinone compound, from 2 to 6 moles of 1,6-hexanediol in the presence of ethylene oxide adducts on phenols or alkanols and/or polyethylene glycols at from 125° to 135° C. and then heating the resulting reaction mixture at from 140° to 150° C., in the course of which the stage 1 byproducts, namely the 1',6'-bis(1-amino-4-hydroxyanthraquinonyloxy)hexane diether is cleaved into (I), leaving a diether level of $\leq 2\%$ by weight in (I).

7 Claims, No Drawings

PREPARATION OF 1-AMINO-4-HYDROXY-2-(6'-HYDROXYHEXOXY)-ANTHRAQUINONE

This anthraquinone compound is a long known useful disperse dye for PES fiber material.

According to German Pat. No. 1,209,680, this dye is obtained by reacting 1-amino-4-hydroxy-2-phenoxyanthraquinone with 1,6-hexanediol in the presence of an alkaline agent. In a variant of the process, the phenoxy compound is prepared as an intermediate in a reaction mixture with the diol and the alkaline agent from 1-amino-4-hydroxy-2-bromoanthraquinone or -2-chloroanthraquinone and a phenol and further reacted with the diol.

The disadvantage with this process is the large excess of diol, ranging from about 8 to 10 moles of diol, and in the case of the variant the similarly large excess of phenol, amounting to about 4 moles of phenol and 9 moles of diol per mole of starting compound. The large quantities of diol and, as the case may be, phenol make it necessary, after the dye has been separated off, to work up the reaction mixture, which is associated with high costs.

In Swiss Pat. No. 457,665, 1-amino-4-hydroxy-2-(hydroxyalkoxy)anthraquinones are prepared by reacting 1-amino-2-chloro-4-hydroxyanthraquinone with diols in the presence of potassium hydroxide and in the absence of phenol. The dyes obtained by this process are, according to German Laid-Open Application DOS 2,243,197, not sufficiently pure for use as disperse dyes for polyester fibers. The byproducts present in the dye dull the shade and confer on the dyeings poor coloristic properties, such as poor fastness to dry heat setting and pleating and poor light fastness, and are also responsible for reduced affinity.

In the process of said Swiss patent, the diol also acts as a solvent or reaction medium, so that the ratio of diol:2-chloroanthraquinone compound is >40:1 molar; that is, this process has the same disadvantages as that disclosed in German Pat. No. 1,209,680.

According to German Laid-Open Application DOS 2,405,782, 1-amino-2-alkoxy-4-hydroxyanthraquinone compounds are prepared by reacting a primary alcohol with 1-amino-2-chloro-4-hydroxyanthraquinone in the presence of phenol, alkaline agents and polyethylene glycols using either an excess of the alcohol as solvent or a further solvent, for example N-methylpyrrolidone, N,N-dimethylformamide or dimethyl sulfoxide. These solvents, according to EP-A-71,576 page 1 paragraph 3, are not ideal for an industrial production of 1-amino-2-alkoxy-4-hydroxyanthraquinone since their stability, in particular at high temperatures, in the presence of the alkaline agents leaves something to be desired and the regeneration of these solvents from the mother liquor is very costly. This is also true of the diol, since the ratio of 1-amino-2-chloro-4-hydroxyanthraquinone:diol is even in the favorable cases of additional polar organic solvents still about 1:8 molar (cf. Example 34) and industrial recovery of the diol from the mother liquor presents almost insurmountable difficulties.

German Laid-Open Application DOS 2,243,197 describes a process whereby virtually pure 1-amino-4-hydroxy-2-(hydroxyalkoxy)anthraquinones are obtained by reacting 1-amino-4-hydroxy-2-haloanthraquinone with diols in the presence of alkaline agents and phenols when the reaction is carried out in water-miscible solvents virtually inert toward the alkaline agents. To obtain complete and rapid conversion, an excess of diol is convenient and necessary. According to the particulars on page 6 of said DOS, the ratio of 1-amino-4-hydroxy-2-haloanthraquinone:diol is in general from 1:6 to 1:12 molar, preferably from 1:8 to 1:9 molar. This process too thus has the disadvantage of the costly regeneration of the excess of diol and the removal thereof from admixtures.

According to EP-A-71,576, 1-amino-4-hydroxy-2-alkoxyanthraquinones are obtained by reacting 1-amino-2-chloro-4-hydroxyanthraquinone with alcohols or phenols in the presence of an alkaline agent and in the presence of a quaternary ammonium or phosphonium salt or of a crown ether as transfer catalyst in an organic solvent.

This procedure has the disadvantages of handling, of ecological and toxicological problems due to the solvents and phase transfer catalysts used, and of costs for regenerating organic solvents such as chlorobenzene, nitrobenzene or ethylene glycol ethers. The molar ratio of diol:1-amino-2-chloro-4-hydroxyanthraquinone used in the process of said EP-A is from 1:2 to 1:10, preferably from 1:2 to 1:4.

The amount of quaternary ammonium or phosphonium salt added is of the order of up to 20% by weight, based on the 2-haloanthraquinone compound, and therefore is to a high degree ecologically unsafe and wasteful, since these salts cannot be recovered in the working up.

On repeating Example 5 of EP-A-71,756, which describes the reaction of 1-amino-2-chloro-4-hydroxyanthraquinone with 1,6-hexanediol in a molar ratio of 1:3, the result obtained was a dye which produced appreciably duller and paler dyeings on polyester than the dyes obtained as described in Example 2.2 of German Pat. No. 1,209,680, Example 1 of German Laid-Open Application DOS 2,243,197 or Example 34 of German Laid Open Application DOS 2,405,782. The dye obtained by the process of said EP-A left filter deposits in cheese and cone dyeings. On knitting up the yarn thus died the fabrics obtained are coloristically unusable. Chromatographic analysis of the yarn obtained in accordance with said EP-A shows that it contains only 74% by weight of 1-amino-2-(6'-hydroxyhexoxy)-4-hydroxyanthraquinone besides a byproduct of about 21% by weight (see Comparative Example 4).

If one seeks to minimize or evade the disadvantage of the process of German Pat. No. 1,209,680, which resides in the difficult regeneration of the diol used in excess, by reducing the ratio of diol:2-haloanthraquinone compound, the results obtained are dyes whose dyeings on polyester fiber material are generally the duller, bluer and weaker the lower the ratio. In package dyeings there are accordingly increasing filter deposits on the inner surface of the package. Knitting up such dyed yarns gives unlevel, skittery fabrics of no utility.

According to analysis and structural elucidation, this byproduct which dulls the shade and forms the filter deposit has the formula (II)

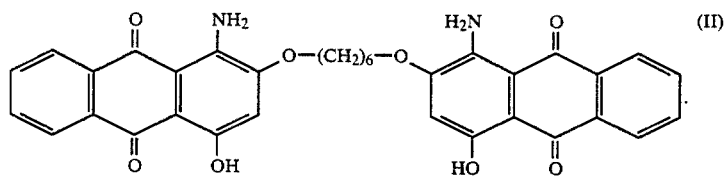

(II) will hereinafter also be referred to as diether. (II) is formed in increasing quantity if, in the synthesis, the ratio of 1,6-hexanediol:1-amino-2-halo-4-hydroxyanthraquinone is <8:1 molar, in particular <6:1 molar. If the ratio is 2:1, the dye obtained contains about 50% by weight of (II).

The diether (II) can be efficiently separated from the dye (I) of the formula

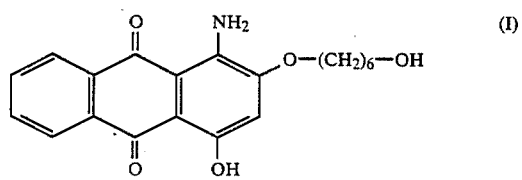

by column chromatography (over Sephadex) and quantitatively assayed by subsequent photometric determination at 523 nm.

The disadvantages described are observed for all prior art processes for preparing (I).

It is an object of the present invention to provide a process whereby the dye (I) is obtained directly from 1-amino-2-halo-4-hydroxyanthraquinone and 1,6-hexanediol in sufficient purity for dyeing without the prior art disadvantages relating to the regeneration of the previously required high excess of the diol.

We have found that this object is achieved with a process for preparing 1-amino-2-(6'-hydroxyhexoxy)-4-hydroxyanthraquinone (I) by reacting 1-amino-2-phenoxy-4-hydroxyanthraquinone (III) or a mixture of 1-amino-2-chloro(bromo)-4-hydroxyanthraquinone (IV) and a phenol with 1,6-hexanediol in excess in the presence of an alkaline agent at elevated temperatures, which comprises using in the reaction per mole of (III) or (IV) from 2 to 6 moles of 1,6-hexanediol and heating the mixture in the presence of from 50 to 150% by weight, based on (III) or (IV), of a polyethylene glycol, of an ethylene oxide adduct on a phenol, on a $C_1$–$C_{20}$-alkylphenol, on a $C_1$–$C_{20}$-alkanol or a mixture thereof at from 125° to 135° C. to produce a mixture of (I) and 1',6'-bis(1-amino-4-hydroxyanthraquinonyloxy)hexane (II) and subsequently heating the reaction mixture obtained at from 140° to 150° C. until the proportion of (II) is ≦2% by weight, based on (I).

The process gives (I) in high yield and purity. the proportion of (II) therein is reducible to 2% by weight or below.

It is surprising that the diether (II) formed as expected in the synthesis in a high proportion is reducible to 2% by weight or below by heating the reaction mixture at from 140° to 150° C. To obtain (I) in high yield and purity, the specified sequence of reaction at from 125° to 135° C. and subsequent heating at from 140° to 150° C. is an absolute prerequisite. If the reaction is carried out from the start at from 140° to 150° C., the dye is obtained in a lower yield and has worse coloristic properties.

In the process of the present invention, 1-amino-2-halo-4-hydroxyanthraquinone (IV) is reacted with the diol in a conventional manner, the ratio of (IV):1,6-hexanediol being from 1:2 to 1:6, preferably from 1:3 to 1:4, molar. Advantageously, the reaction is carried out as described in German Laid-Open Application DOS 2,405,782 at from 125° to 135° C. in the presence of a polyethylene glycol.

Advantageously, the hexanediol is added to the mixture of 1-amino-2-halo-4-hydroxyanthraquinone, alkaline agent, phenol and polyethylene glycol or ethylene oxide adduct and the mixture is heated to from 125° to 135° C. The reaction has generally ended after from 4 to 8 hours. At these temperatures the product is a mixture containing from 70 to 85% by weight of (I) and from 30 to 15% by weight of (II).

The reaction mixture is then heated to from 140° to 150° C., preferably to 145° to 150° C., and maintained at that temperature until the proportion of (II) is 2% by weight, based on the mixture of (I) and (II), or below. This generally requires from 4 to 16 hours at the temperatures mentioned.

Suitable 1-amino-2-halo-4-hydroxyanthraquinones (IV) are the 2-bromo and the 2-chloro compounds, of which the 2-chloro compound is preferred.

Owing to the use of (IV) as starting compound, the conversion to (I) must be carried out in the presence of a phenol. From 0.5 to 1.5 moles of phenol are sufficient per mole of (IV). Suitable phenols are the cresols, the xylenols, p-chlorophenol and preferably the unsubstituted parent structure, namely phenol, itself.

If 2-phenoxy- or 2-methoxy-1-amino-4-hydroxyanthraquinone is used as starting compound, the presence of phenol becomes dispensable.

Suitable alkaline agents for the reaction are alkali metal hydroxides, such as sodium hydroxide or potassium hydroxide, alkali metal carbonates, such as sodium hydrogencarbonate, potassium hydrogencarbonate, sodium carbonate or potassium carbonate, and mixtures thereof. Of the compounds mentioned, potassium hydroxide and in particular potassium hydrogencarbonate and potassium carbonate are particularly preferred. At any weight, the amount of alkaline agent required per mole of 2-haloanthraquinone is not less than 1 equivalent. It is advantageous to use from 1.5 to 2 equivalents of alkaline agent.

Suitable polyethylene glycols for the process of the invention are those having a molecular weight of 150 or higher. The molecular weight does not have a great influence on the rate of reaction; for instance, a polyglycol having a molecular weight of about 10,000 has the same favorable effect on the reaction as a polyglycol having a molecular weight of about 200 or 1,000. Suitable polyethylene glycols for carrying out the process of the invention are for example triethylene glycol, tetraethylene glycol and polyglycols having an average molecular weight of 150 to about 10,000. Polyglycols are generally present as mixtures.

It is similarly advantageous to use ethylene oxide adducts on phenol, on $C_1$–$C_{20}$-alkylphenols and $C_1$–$C_{20}$-alkanols and mixtures thereof in place of polyethylene glycols. Specific examples are the adduct of nonylphenol and on average 14 ethylene oxide units, nonylphenol and on average 20 ethylene oxide units, nonylphenol and on average 10 ethylene oxide units, isooctylphenol and on average 10 ethylene oxide units and $C_{16}/C_{18}$-alkanol mixture with on average 15 ethylene oxide units.

The amount of these agents is from 50 to 150% by weight, based on the amount of anthraquinone compound (III) or (IV).

The process will be further illustrated by the Examples below. Parts and percentages are by weight. Parts by volume bear the same relation to parts by weight as the liter to the kilogram.

EXAMPLE 1

A mixture of 60 parts of 1,6-hexanediol, 7.5 parts of phenol and 50 parts of the adduct of 14 ethylene oxide units on nonylphenol is heated to 110° C. At this temperature 37.6 parts of 1-amino-2-chloro-4-hydroxyanthraquinone (purity 93%) and 35 parts of anhydrous potash are added under a slow stream of nitrogen. The mixture is then heated to 130° C. and maintained at from 130° to 135° C. with stirring. After 6 hours, analysis of the sample by thin layer chromatography indicates complete conversion of the pink chloride. The separation of the sample by means of column chromatography shows 75.8% of (I) and 14.9% of diether (II).

Thereafter the reaction mixture is heated with stirring to from 145° to 148° C. and is maintained at that temperature for 10 hours. At 2 hour intervals at 145°/148° C. a sample is taken and analyzed chromatographically in respect of dye and diether contents. The proportions of (I) and (II) are indicated in the table.

|  | Proportion of diether (II) [%] | (I) [%] |
| --- | --- | --- |
| Dye formation after 6 hrs at 130/135° C. | 14.9 | 75.8 |
| Diether degradation |  |  |
| after 2 hrs at 145/148° C. | 11.0 | 78.6 |
| after 4 hrs at 145/148° C. | 7.4 | 84.6 |
| after 6 hrs at 145/148° C. | 1.7 | 86.3 |
| after 8 hrs at 145/148° C. | 1.5 | 87.9 |
| after 10 hrs at 145/148° C. | 1.2 | 91.6 |

The batch is then cooled down to 100° C. and diluted with 140 parts of water. The mixture is stirred at from 60° to 65° C. and filtered hot, and the filter residue is washed light-colored and neutral. Yield: 37 parts of 1-amino-2-(6'-hydroxyhexoxy)-4-hydroxyanthraquinone which, by column chromatography, contains 91.6% of (I) and 1.2% of (II). On PES the dye produces pink dyeings of high purity and brilliance and blemish-free cheese and cone dyeings.

EXAMPLE 2

A mixture of 70 parts of 1,6-hexanediol, 10 parts of phenol and 44 parts of a polyglycol (n=8–10 ethylene oxide units) is heated under a stream of nitrogen to 100° C. At that temperature, 37 parts of 1-amino-2-chloro-4-hydroxyanthraquinone (purity 93%) and 35 parts of anhydrous potassium carbonate are added. The mixture is then heated still under a stream of nitrogen to from 130° to 135° C. and maintained at that temperature for 6 hours. A sample analyzed by thin layer chromatography then shows the complete conversion of the pink chloride. Analysis of the sample by column chromatography indicates 72.7% of (I) and 19.7% of diether (II). The reaction mixture is then heated with stirring at from 145° to 148° C. for 14 hours. At 2 hour interval at 145°/148° C. a sample is analyzed by column chromatography. The analytical results are given in the table below.

|  | Proportion of diether (II) [%] | (I) [%] |
| --- | --- | --- |
| Dye formation after 6 hrs at 130/135° C. | 19.7 | 72.7 |
| Diether degradation: |  |  |
| after 2 hrs at 145/148° C. | 16.5 | 76.5 |
| after 4 hrs at 145/148° C. | 14.0 | 77.6 |
| after 8 hrs at 145/148° C. | 11.2 | 80.8 |
| after 10 hrs at 145/148° C. | 9.8 | 82.4 |
| after 12 hrs at 145/148° C. | 5.0 | 85.1 |
| after 14 hrs at 145/148° C. | 1.7 | 91.7 |

The batch is then cooled down to 100° C. and diluted with 140 parts of water. The mixture is stirred at from 60° to 65° C. for 2 hours and filtered hot, and the filter residue is washed light-colored and neutral. 37.4 parts are obtained of a dye which by column chromatography contains 91.7% of (I) and 1.7% of (II). On polyester the dye gives pink dyeings of high brilliance and blemish-free cheese and cone dyeings.

EXAMPLE 3

A mixture of 42 g of 1,6-hexanediol, 6.5 parts of phenol and 50 parts of the adduct of 14 ethylene oxide units on nonylphenol is heated to 110° C., and at that temperature 37.6 parts of 1-amino-2-chloro-4-hydroxyanthraquinone (purity 93%) and 35 parts of anhydrous potash are added under a slow stream of nitrogen. The mixture is then heated to 130° C. and maintained at from 130° to 135° C. with stirring for 6 hours. The result is a mixture of dye (I) and diether (II) in a weight ratio of 73%:20%.

The degradation of diether (II) to dye (I) is effected by heating the reaction mixture with stirring at from 145° to 148° C. for 12 hours.

37 parts of dye are isolated, for which column chromatography indicates a (I) content of 92.5% and a (II) content of 2.0%. The dye dyes polyester in brilliant pink shades having the application properties indicated in Example 1.

COMPARATIVE EXAMPLE 1

(German Pat. No. 1,209,680, Example 2)

(a) Following the procedure of Example 2.2 of German Pat. No. 1,209,680, 30 parts of 1-amino-2-bromo-4-hydroxyanthraquinone are reacted with 30 parts of phenol and 80 parts of hexanediol in the presence of 12 parts of potassium hydroxide.

Yield: 24 parts of dye containing, by chromatography, 76% of (I) and 11% of (II).

On PES the dye produces appreciably duller and bluer dyeings than the dye obtained according to Example 1.

(b) The reaction is carried out as indicated under (a), except that an equivalent amount (=27 parts) of 1-amino-2-chloro-4-hydroxyanthraquinone is used.

Yield: 24 parts of dye containing 75% of (I) and 4% of (II).

The dye gives appreciably duller and bluer dyeings than the dye obtained according to Example 1.

COMPARATIVE EXAMPLE 2

(German Pat. No. 1,209,680, Example 1)

Following the procedure of Example 1 of German Pat. No. 1,209,680, 47 parts of 1-amino-2-phenoxy-4-hydroxyanthraquinone are reacted with 197 parts of hexanediol in the presence of 6 parts of potassium hydroxide at 135° C. for 2.5 hours. Yield; 43 parts of dye containing, by chromatography, 18% of (I) and still 82% of unconverted 1-amino-2-phenoxy-4-hydroxyanthraquinone. Compound (II) is not detectable.

COMPARATIVE EXAMPLE 3

(German Pat. No. 1,209,680, Example 2.1)

Following the directions of Example 2.1 of German Pat. No. 1,209,680, 47 parts of 1-amino-2-phenoxy-4-hydroxyanthraquinone are reacted with 130 parts of hexanediol in the presence of 10 parts of potassium hydroxide at 140° C. for 4 hours. Yield: 42 parts of dye containing, by chromatography, 34% of (I) and still 65% of unconverted 1-amino-2-phenoxy-4-hydroxyanthraquinone. Compound (II) is not detectable.

COMPARATIVE EXAMPLE 4

(a) In accordance with Example 5 of EP-A-71,576, 30 parts of 1-amino-2-chloro-4-hydroxyanthraquinone (purity 93%) are admixed with 30 parts by volume of anhydrous nitrobenzene, 5 parts of tetrabutylammonium bromide, 10.4 parts of phenol, 38 parts of 1,6-hexanediol and 13.2 parts of anhydrous potassium carbonate. The mixture is heated to from 150° to 155° C. under a slow stream of nitrogen and is stirred at that temperature for 8 hours. It is then diluted with 90 parts by volume of methanol and filtered at room temperature, and the filter residue is washed with methanol and water and dried. This gives 28.9 parts of dye containing, by column chromatography, 74.4% of (I) and 21.2% of (II). Compared with the dyes obtained by the process of the invention, the dye gives appreciably duller and bluer polyester dyeings. The cheese and cone dyeings are not blemish-free.

(b) The procedure of (a) is followed, except that the tetrabutylammonium bromide is replaced by the same amount of distearyldimethylammonium chloride. 26 parts are obtained of a dye containing 65% of (I) and 17% of (II).

Compared with the dye obtained according to Example 1, this dye gives duller and bluer dyeings. The cheese and cone dyeings are not blemish-free.

I claim:

1. The process for preparing 1-amino-2-(6'-hydroxyhexoxy)-4-hydroxyanthraquinone, which comprises:
   (a) reacting 1-amino-2-phenoxy-4-hydroxyanthraquinone or a mixture of 1-amino-2-chloro(bromo)-4-hydroxyanthraquinone and a phenol with 1,6-hexanediol, in excess, in the presence of an alkaline agent at elevated temperatures, using from about 2 to 6 moles of 1,6-hexanediol per mole of 1-amino-2-phenoxy-4-hydroxyanthraquinone or 1-amino-2-chloro(bromo)-4-hydroxyanthraquinone, and heating said mixture in the presence of from about 50 to 150% by weight, based on either of said hydroxyanthraquinone compounds, of a polyethylene glycol, of an ethylene oxide adduct on a phenol, a $C_1$–$C_{20}$-alkylphenol, or a $C_1$–$C_{20}$-alkanol or a mixture thereof, at from about 125° to 135° C., to produce a mixture of said 1-amino-2-(6'-hydroxyhexoxy)-4-hydroxyanthraquinone and 1',6'-bis(1-amino-4-hydroxyanthraquinonyloxy)hexane; and
   (b) heating the reaction mixture at from about 140° to 150° C., until the proportion of said 1',6'-bis(1-amino-4-hydroxyanthraquinonyloxy)hexane is less than or equal to 2% by weight, based on the weight of said 1-amino-2-(6'-hydroxyhexoxy)-4-hydroxyanthraquinone.

2. The process as claimed in claim 1, wherein a polyethylene glycol having a molecular weight of from 150 to 10,000 or the reaction product of nonylphenol and 10, 14 or 20 moles of ethylene oxide per mole of phenol, of isooctylphenol with 10 moles of ethylene oxide or of a $C_{16}/C_{18}$-alkanol mixture with on the average 15 moles of ethylene oxide is used.

3. The process as claimed in claim 1, wherein said 1-amino-2-chloro(bromo)-4-hydroxyanthraquinone is reacted with said 1,6-hexanediol in a molar ratio of from about 1:2 to 1:6, respectively.

4. The process as claimed in claim 1, wherein said 1,6-hexanediol is added to the mixture of 1-amino-2-chloro(bromo)-4-hydroxyanthraquinone, alkaline agent, phenol and polyethylene glycol or ethylene oxide adduct and the mixture is heated to from about 125° to 135° C.

5. The process as claimed in claim 1, wherein the reaction mixture of step (a) is subsequently heated in step (b) at from about 145° to 150° C.

6. The process as claimed in claim 1, wherein said alkaline agent is an alkali metal hydroxide, alkali metal carbonate or alkali metal hydrogen carbonate or a mixture thereof.

7. The process as claimed in claim 6, wherein not less than about 1 equivalent of alkaline agent is used per mole of said 1-amino-2-chloro(bromo)-4-hydroxyanthraquinone.

* * * * *